US012673300B2

(12) United States Patent
Miyabe et al.

(10) Patent No.: US 12,673,300 B2
(45) Date of Patent: Jul. 7, 2026

(54) COMPOSITE SEMIPERMEABLE MEMBRANE, AND SPIRAL MEMBRANE ELEMENT

(71) Applicant: NITTO DENKO CORPORATION, Osaka (JP)

(72) Inventors: Tomotsugu Miyabe, Osaka (JP); Atsuki Hirabara, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 379 days.

(21) Appl. No.: 18/440,083

(22) Filed: Feb. 13, 2024

(65) Prior Publication Data
US 2024/0293783 A1     Sep. 5, 2024

(30) Foreign Application Priority Data
Mar. 2, 2023     (JP) ................................. 2023-032059

(51) Int. Cl.
| | |
|---|---|
| *B01D 69/12* | (2006.01) |
| *B01D 63/10* | (2006.01) |
| *B01D 71/56* | (2006.01) |
| *B01D 71/68* | (2006.01) |

(52) U.S. Cl.
CPC ............. B01D 69/12 (2013.01); B01D 63/10 (2013.01); B01D 71/56 (2013.01); B01D 71/68 (2013.01); *B01D 2325/20* (2013.01)

(58) Field of Classification Search
None
See application file for complete search history.

(56) References Cited

U.S. PATENT DOCUMENTS

| | | | | |
|---|---|---|---|---|
| 2017/0120201 A1* | 5/2017 | Shimura | ................ | C08G 69/32 |
| 2019/0217249 A1* | 7/2019 | Amado-Torres | ....... | B01D 71/56 |

FOREIGN PATENT DOCUMENTS

| | | | | |
|---|---|---|---|---|
| CN | 109569314 A | * | 4/2019 | ......... B01D 67/0079 |
| JP | 3852211 B2 | | 11/2006 | |

OTHER PUBLICATIONS

EESR issued in EP Patent Application No. 24159187.4, Jun. 10, 2024.

(Continued)

*Primary Examiner* — Krishnan S Menon
(74) *Attorney, Agent, or Firm* — GREENBLUM & BERNSTEIN, P.L.C.

(57) ABSTRACT

A composite semipermeable membrane includes: a porous support including a porous resin layer; and a separation functional layer formed of a polyamide-based resin on the porous resin layer. The polyamide-based resin contains a resin component derived from a divalent polyfunctional amine and a trivalent or higher polyfunctional acid halide, a molar ratio of the trivalent or higher polyfunctional acid halide to the divalent polyfunctional amine is in a range of 0.65 to 1.00, and a terminal carboxyl group concentration is 0.01 or less. The composite semipermeable membrane has an amide intensity ratio of 0.60 or more, the amide intensity ratio being a ratio of an absorption peak intensity derived from C=O stretching vibration of an amide group to an absorption peak intensity derived from a repeating unit of the porous resin layer, when measuring the absorption peaks by an ATR-IR method.

10 Claims, 1 Drawing Sheet

(56)        References Cited

OTHER PUBLICATIONS

Su-Min Kim: "Effect of Additives during Interfacial Polymerization Reaction for Fabrication of Organic Solvent Nanofiltration (OSN) Membranes", Polymers, vol. 13, No. 11, May 24, 2021 (May 24, 2021), p. 1716.

Tang C Y et al: "Effect of membrane chemistry and coating layer on physiochemical properties of thin film composite polyamide RO and NF membranes", Desalination, Elsevier, Amsterdam, NL, vol. 242, No. 1-3, Jun. 1, 2009 (Jun. 1, 2009), pp. 149-167.

Byung-Moon Jun: "Post-Treatment of Nanofiltration Polyamide Membrane through Alkali-Catalyzed Hydrolysis to Treat Dyes in Model Wastewater", Water, vol. 11, No. 8, Aug. 9, 2019 (Aug. 9, 2019), p. 1645.

* cited by examiner

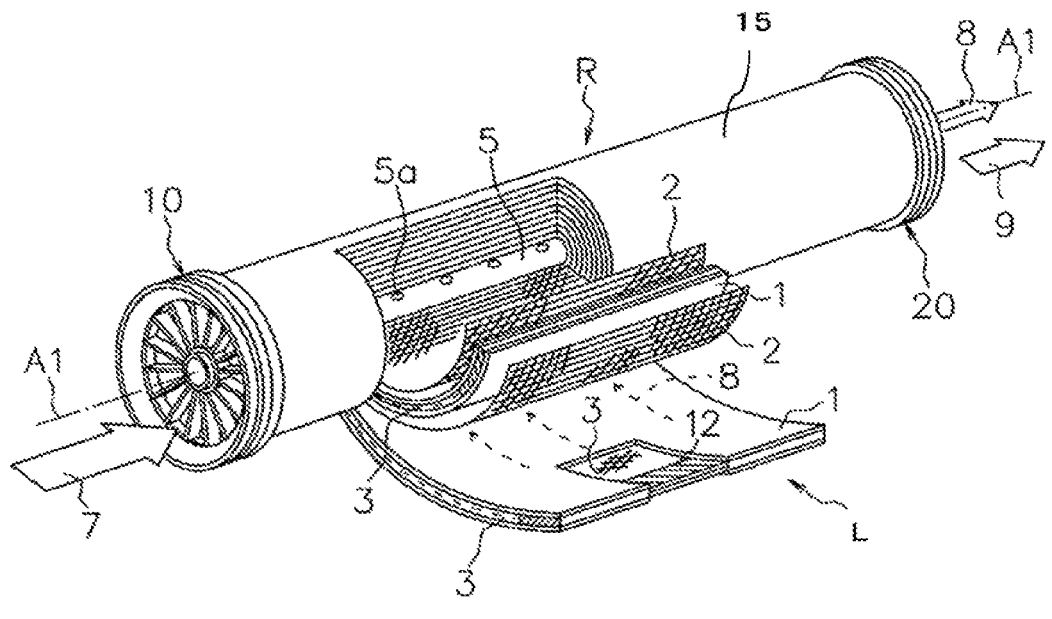

COMPOSITE SEMIPERMEABLE MEMBRANE, AND SPIRAL MEMBRANE ELEMENT

BACKGROUND OF THE INVENTION

Field of the Invention

The present invention relates to a composite semipermeable membrane which includes a porous support including a porous resin layer and a separation functional layer formed of a polyamide-based resin, and a spiral membrane element (hereinafter, may be abbreviated as a "membrane element") including the composite semipermeable membrane.

Description of the Related Art

In recent years, as a composite semipermeable membrane used for the production of drinking water, particularly overseas, there is an increasing demand for a composite semipermeable membrane excellent in rejection performance against organic compounds (for example, molecular weight: 150 to 250) such as herbicides and odor components and water permeability when removing the organic compounds.

At present, an NF membrane called a partially desalted loose type, which causes inorganic salts to permeate more easily than an RO membrane used for a desalination treatment, is commercially available, and its application to the use of the production of drinking water as described above is being studied. However, the commercially available partially desalted loose type NF membrane has problems that the membrane has insufficient water permeability even when the membrane is excellent in rejection performance against organic compounds such as herbicides and odor components, or the membrane has insufficient rejection performance against the organic compounds even when the membrane is excellent in water permeability.

In particular, in the use of the production of drinking water, the treatment amount is large, and therefore it is currently difficult to obtain a composite semipermeable membrane having enhanced water permeability while maintaining rejection performance although energy saving is important.

Meanwhile, as a composite semipermeable membrane often used industrially, for example, a composite semipermeable membrane is known, in which a skin layer containing a polyamide-based resin obtained by reacting a polyfunctional amine component and a polyfunctional acid halide component is formed as a separation functional layer on the surface of a porous resin layer of a porous support. For such a composite semipermeable membrane, a method in which water permeability is reduced by reducing the molar ratio of a trivalent or higher polyfunctional acid halide to a divalent polyfunctional amine to make a crosslinked structure loose is known.

For example, Patent Document 1 proposes a composite semipermeable membrane in which an ultrathin film layer of a crosslinked polyamide is formed on a microporous support membrane, wherein the carboxyl group concentration in the ultrathin film layer analyzed using X-ray photoelectron spectroscopy (ESCA) is 0.02 to 0.07, and the permeation amount of water at an operating pressure of 0.3 MPa is 0.5 to 3.0 $m^3/m^2 \cdot d$.

PRIOR ART DOCUMENT

Patent Document

Patent Document 1: JP-B-3852211

SUMMARY OF THE INVENTION

However, according to the study of the present inventors, it has been found that when the carboxyl group concentration is increased by making the crosslinked structure loose, the performance of the membrane may be greatly changed when the membrane comes into contact with an alkali used for chemical cleaning, resulting in difficult chemical cleaning. It has been found that when the crosslinked structure is loose, the rejection performance against organic compounds such as herbicides and odor components may be insufficient.

Therefore, an object of the present invention is to provide a composite semipermeable membrane which can obtain desired rejection performance and is excellent in both alkali durability and water permeability, and a spiral membrane element including the composite semipermeable membrane.

As a result of intensive studies to solve the above problems, the present inventors have found that both alkali durability and water permeability can be achieved while desired rejection performance is maintained by increasing an amide intensity ratio while reducing a terminal carboxyl group concentration even when the molar ratio of a trivalent or higher polyfunctional acid halide to a divalent polyfunctional amine is 0.65 to 1.00, and have completed the present invention. That is, the present invention includes the following aspects.

[1] A composite semipermeable membrane including:

a porous support including a porous resin layer; and a separation functional layer formed of a polyamide-based resin on the porous resin layer, in which the polyamide-based resin contains a resin component derived from a divalent polyfunctional amine and a trivalent or higher polyfunctional acid halide, a molar ratio of the trivalent or higher polyfunctional acid halide to the divalent polyfunctional amine is in a range of 0.65 to 1.00, and a terminal carboxyl group concentration is 0.01 or less, and the composite semipermeable membrane has an amide intensity ratio of 0.60 or more, the amide intensity ratio being a ratio of an absorption peak intensity derived from C=O stretching vibration of an amide group to an absorption peak intensity derived from a repeating unit of the porous resin layer, when measuring the absorption peaks by an ATR-IR method.

According to the composite semipermeable membrane of the present invention, desired rejection performance can be obtained, and both alkali durability and water permeability can be achieved. Details of the reason are unknown, but it is considered as follows. Since the molar ratio of the trivalent or higher polyfunctional acid halide to the divalent polyfunctional amine constituting the polyamide-based resin forming the separation functional layer is in the range of 0.65 to 1.00, a crosslinked structure can be made loose while rejection performance against organic compounds such as herbicides and odor components is maintained. At that time, it is considered that the alkali durability can be improved by reducing the terminal carboxyl group concentration, and the water permeability is improved by increasing the amide intensity ratio to increase a substantial membrane area in a surface microstructure.

[2] The composite semipermeable membrane according to [1], in which the polyamide-based resin contains a resin component derived from m-phenylenediamine (MPD) and trimesic acid chloride (TMC), and a molar ratio of TMC to MPD (TMC/MPD) is in a range of 0.65 to 1.00.

The polyamide-based resin contains the resin component derived from m-phenylenediamine (MPD) and trimesic acid chloride (TMC), and the molar ratio of TMC to MPD (TMC/MPD) is in the range of 0.65 to 1.00, and therefore it is considered that the crosslinked structure can be made loose while the rejection performance against organic compounds such as herbicides and odor components is more appropriately maintained.

[3] The composite semipermeable membrane according to [1] or [2], in which the porous resin layer is formed of a polysulfone-based resin, and the absorption peak intensity derived from the repeating unit is an absorption peak intensity derived from stretching vibration of O—C—O.

When the porous resin layer is formed of a polysulfone-based resin, the relative amount of the amide group can be more accurately quantified by using the absorption peak intensity derived from the stretching vibration of O—C—O as a reference, so that the absorption peak intensity becomes more appropriate as an index of the substantial membrane area in the microstructure.

[4] The composite semipermeable membrane according to any one of [1] to [3], in which a rejection of geosmin is 99.5% or more.

By setting such a rejection of geosmin, the rejection performance against organic compounds (for example, molecular weight: 150 to 250) such as herbicides and taste and odor components can be made sufficient.

[5] The composite semipermeable membrane according to any one of [1] to [4], having a water permeability of 9.0 LMH/bar or more when evaluated using model water that simulates river water.

When the water permeability using the model water is in this range, it is easy to achieve both rejection performance and water permeability against the organic compounds having a trade-off relationship.

[6] A spiral membrane element including the composite semipermeable membrane according to any one of [1] to [5].

Since the spiral membrane element of the present invention includes the composite semipermeable membrane of the present invention as described above, it is possible to provide the spiral membrane element which can obtain desired rejection performance and is excellent in both alkali durability and water permeability.

According to the present invention, it is possible to provide a composite semipermeable membrane which can obtain desired rejection performance against organic compounds such as herbicides and odor components and is excellent in both alkali durability and water permeability, and a spiral membrane element including the composite semipermeable membrane.

BRIEF DESCRIPTION OF THE DRAWING

FIG. 1 is a partially cutaway perspective view showing an example of a spiral membrane element.

4

DETAILED DESCRIPTION OF THE
PREFERRED EMBODIMENTS

Hereinafter, embodiments of the present invention will be described.

(Composite Semipermeable Membrane)

A composite semipermeable membrane of the present invention includes a porous support including a porous resin layer, and a separation functional layer formed of a polyamide-based resin on the porous resin layer. The polyamide-based resin that forms the separation functional layer contains a resin component derived from a divalent polyfunctional amine and a trivalent or higher polyfunctional acid halide.

The separation functional layer can be formed by the interfacial polymerization or the like of the polyamide-based resin, and is particularly preferably a separation functional layer containing a polyamide-based resin obtained by polymerizing a polyfunctional amine component and a polyfunctional acid halogen component.

The polyfunctional amine component is a polyfunctional amine having two or more reactive amino groups. Examples thereof include aromatic, aliphatic, and alicyclic polyfunctional amines. In the present invention, at least a divalent polyfunctional amine is used as the polyfunctional amine component.

Examples of the aromatic polyfunctional amines include m-phenylenediamine (MPD), p-phenylenediamine, o-phenylenediamine, 1,3,5-triaminobenzene, 1,2,4-triaminobenzene, 3,5-diaminobenzoic acid, 2,4-diaminotoluene, 2,6-diaminotoluene, N, N'-dimethyl-m-phenylenediamine, 2,4-diaminoanisole, amidol, and xylylenediamine.

Examples of the aliphatic polyfunctional amines include ethylenediamine, propylenediamine, tris(2-aminoethyl) amine, and n-phenyl-ethylenediamine.

Examples of the alicyclic polyfunctional amines include 1,3-diaminocyclohexane, 1,2-diaminocyclohexane, 1,4-diaminocyclohexane, piperazine, 2,5-dimethylpiperazine, and 4-aminomethylpiperazine.

These polyfunctional amines may be used singly or in any combination of two or more thereof. In order to obtain a separation functional layer having desired rejection performance, it is preferable to use an aromatic polyfunctional amine, and it is more preferable to use m-phenylenediamine.

In particular, m-phenylenediamine is preferably used in an amount of 20 to 100 mol %, more preferably 50 to 100 mol %, and most preferably 100 mol % in the polyfunctional amine component, from the viewpoint that a rejection against an organic compound having a molecular weight of 150 to 250 is easily adjusted to a certain level or more. Thus, the separation functional layer can be formed of the polyamide-based resin containing the resin component derived from m-phenylenediamine.

The polyfunctional acid halide component is a polyfunctional acid halide having two or more reactive carbonyl groups. Examples of the polyfunctional acid halide include aromatic, aliphatic, and alicyclic polyfunctional acid halides. In the present invention, at least a trivalent or higher polyfunctional acid halide is used as the polyfunctional acid halide component.

Examples of the aromatic polyfunctional acid halides include trimesic acid chloride (TMC) (trimesic acid trichloride), terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, and chlorosulfonyl-benzene dicarboxylic acid dichloride.

Examples of the aliphatic polyfunctional acid halides include propanedicarboxylic acid dichloride, butanedicarboxylic acid dichloride, pentanedicarboxylic acid dichloride, propanetricarboxylic acid trichloride, butanetricarboxylic acid trichloride, pentanetricarboxylic acid trichloride, glutaryl halides, and adipoyl halides.

Examples of the alicyclic polyfunctional acid halides include cyclopropanetricarboxylic acid trichloride, cyclobutanetetracarboxylic acid tetrachloride, cyclopentanetricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, and tetrahydrofurandicarboxylic acid dichloride.

These polyfunctional acid halides may be used singly or in any combination of two or more thereof. In order to obtain a separation functional layer having high salt-rejection performance, it is preferable to use an aromatic polyfunctional acid halide. It is preferable to form a crosslinked structure using a trivalent or higher polyfunctional acid halide as at least a part of the polyfunctional acid halide component, and it is more preferable to use trimesic acid chloride (TMC).

In particular, trimesic acid chloride (TMC) is preferably used in an amount of 20 to 100 mol %, more preferably 50 to 100 mol %, and most preferably 100 mol % in the polyfunctional acid halide component, from the viewpoint that the rejection against an organic compound having a molecular weight of 150 to 250 is easily adjusted to a certain value or more. Thus, the separation functional layer can be formed of the polyamide-based resin containing the resin component derived from trimesic acid chloride.

The molar ratio of the trivalent or higher polyfunctional acid halide to the divalent polyfunctional amine is 0.65 or more, preferably 0.7 or more, and more preferably 0.8 or more, from the viewpoint of easily obtaining desired rejection performance against the organic compounds having a molecular weight of 150 to 250. The molar ratio of the trivalent or higher polyfunctional acid halide to the divalent polyfunctional amine is 1.00 or less, preferably 0.95 or less, and more preferably 0.9 or less, from the viewpoint of easy adjustment to obtain excellent water permeability. The molar ratio can be adjusted by increasing or decreasing the concentration and use amount of each component.

The molar ratio of the trivalent or higher polyfunctional acid halide to the divalent polyfunctional amine can be calculated by removing a substrate and a porous resin layer from the composite semipermeable membrane, hydrolyzing the obtained separation functional layer with a strong alkaline heavy water solution, filtering the hydrolyzed heavy aqueous solution, performing 1H-NMR measurement, analyzing data obtained by the measurement, and determining the area value of a peak.

In the present invention, the molar ratio of TMC to MPD (TMC/MPD) is preferably 0.65 or more, more preferably 0.7 or more, and still more preferably 0.8 or more, from the viewpoint of easily obtaining desired rejection performance against the organic compounds having a molecular weight of 150 to 250. The molar ratio of TMC to MPD (TMC/MPD) is preferably 1.00 or less, more preferably 0.95 or less, and still more preferably 0.9 or less, from the viewpoint of easy adjustment to obtain excellent water permeability. The molar ratio can be adjusted by increasing or decreasing the concentration and use amount of each component.

When the molar ratio of the trivalent or higher polyfunctional acid halide to the divalent polyfunctional amine is less than 1.5, an unreacted terminal carboxylic acid is present, but when the molar ratio is 1.0 or less, a crosslinked structure becomes loose and water permeability is improved. In general, a large amount of unreacted terminal carboxylic acid is present. The present inventors have found that when a large amount of unreacted terminal carboxylic acid is present as described above, alkali durability tends to decrease.

However, in the present invention, the terminal carboxyl group concentration of the polyamide-based resin that forms the separation functional layer is 0.01 or less, and therefore the alkali durability can be improved. Here, the terminal carboxyl group concentration is the concentration of a terminal carboxyl group derived from a reactive carbonyl group such as an acid halide in the separation functional layer, and is calculated as the ratio of a carboxyl group amount (number of moles) to a total carbon amount (number of moles) in the separation functional layer. The carboxyl group concentration can be determined by X-ray photoelectron spectroscopy (ESCA) using a gas phase chemical modification method exemplified in Journal of Polymer Science Vol. 26 559-572 (1988) and Journal of Japan Adhesion Society Vol. 27 No. 4 (1991). Specifically, the carboxyl group concentration is a value measured as follows.

A sample is subjected to gas phase chemical modification with a labeling reagent (trifluoroethanol), and simultaneously, the reaction rate (r) of the labeling reagent and the residual ratio (m) of a reaction residue are determined from the ESCA spectrum of a polyacrylic acid standard sample subjected to gas phase chemical modification. Next, the area intensity [F1s] of an F1s peak (peak of 1S orbital of fluorine) formed by the reaction between the sample and the labeling reagent is determined. The area intensity [C1s] of a peak (peak of 1S orbital of carbon) defined in the present invention is determined.

The measurement conditions are shown below. QUANTUM 2000 manufactured by ULVAC-PHI, Inc., was used. X-ray output: 15 kV and detector angle: 45° were set and the C1s peak position of neutral carbon (CHx) was adjusted to 285 eV in data processing.

A carboxyl group concentration can be determined by substituting the area intensities [F1s] and [C1s] determined as described above into the following formula:

$$\text{Number of moles of } COOH / \text{number of moles of } C \ [-] =$$

$$[F1s]/((3k_{F1s}[C1s] - (2 + cm)[F1s])r)$$

in the formula, number of moles of COOH/number of C is carboxyl group concentration, [F1s] is area intensity of peak of 1S orbital of fluorine, $k_{F1s}$ is sensitivity correction value of peak of 1S orbital of fluorine, r is reaction rate of labeling reagent, c is number of carbon atoms of catalyst, [C1s] is area intensity of peak of 1S orbital of carbon, and m is residual ratio of reaction residue.

The terminal carboxyl group concentration of the polyamide-based resin is preferably 0.009 or less, and more preferably 0.008 or less, from the viewpoint of alkali durability. The terminal carboxyl group concentration of the polyamide-based resin is preferably as low as possible, but may be 0.001 or more or 0.002 or more.

Examples of the method in which the terminal carboxyl group concentration of the polyamide-based resin is reduced include a method in which a predetermined amount of an interface adjusting agent is added when performing the interfacial polymerization of the polyamide-based resin, a method in which a predetermined amount of a monovalent amine component capable of reacting with an acid halide group or an end modifying compound such as alcohol is added, and a method in which a predetermined amount of the end modifying compound is reacted with the polyamide-based resin obtained by polymerization. Among them, a method in which a predetermined amount of an interface adjusting agent is added when performing the interfacial polymerization of the polyamide-based resin is preferable.

The composite semipermeable membrane of the present invention includes a separation functional layer formed of a polyamide-based resin on a porous resin layer, but an amide intensity ratio of an absorption peak measured by an ATR-IR method, which is a ratio of an absorption peak intensity (around 1620 cm$^{-1}$) derived from C=O stretching vibration of an amide group to an absorption peak intensity derived from a repeating unit of the porous resin layer, is 0.60 or more.

The ATR (Attenuated Total Reflection)-IR method is a method in which light totally reflected on the surface of a sample is measured using the principle of total reflection to obtain an infrared absorption spectrum according to the penetration of the light on the surface of the sample. According to the ATR-IR method, a measurement optical path length does not depend on the thickness of the sample, and therefore the relative amount of amide bonds in the separation functional layer can be measured in a state of being hardly affected by the thickness of the porous resin layer.

Such an amide intensity ratio serves as an index of the relative amount of the amide bonds in the polyamide-based resin, and a large amide intensity ratio means that the mass of the polyamide-based resin per unit area of the porous resin layer is large. Considering that the increase in the amide intensity ratio improves the water permeability, it is considered that the increase in the amide intensity ratio increases a substantial membrane area in a microstructure.

That is, from the viewpoint of improving the water permeability, the amide intensity ratio is preferably 0.62 or more, and more preferably 0.64 or more. The amide intensity ratio is preferably as large as possible, but may be 0.80 or less or 0.70 or less.

Examples of a method in which the amide intensity ratio is increased include a method in which an interface adjusting agent such as an alcohol compound, an alkanolamine compound, an alkyl ketone compound, or an alkyl ester compound is added when performing the interfacial polymerization of the polyamide-based resin, and a method in which an interfacial polymerization temperature is increased.

In order to improve the performance of the separation functional layer containing the polyamide-based resin, a polymer such as polyvinyl alcohol, polyvinylpyrrolidone, or polyacrylic acid, and a polyhydric alcohol such as sorbitol or glycerin, and the like may be copolymerized.

The porous support supporting the separation functional layer only needs to have the porous resin layer, and may be formed only of the porous resin layer, but is preferably reinforced by backing with a substrate such as a woven fabric or a nonwoven fabric. The porous support including the porous resin layer is not particularly limited as long as the porous support can support the separation functional layer on the upper surface thereof, and usually, an ultrafiltration membrane having an average pore diameter of about 10 to 500 Å is preferably used.

Examples of materials for forming the porous resin layer include various materials such as polysulfone-based resins (such as polysulfone, polyethersulfone, and polyphenylsulfone), polyimide, polyetherimide, and polyvinylidene fluoride, and polysulfone-based resins are preferably used from the viewpoint of being chemically, mechanically, and thermally stable.

The amide intensity ratio is a ratio of an absorption peak intensity derived from C=O stretching vibration of the amide group to an absorption peak intensity derived from the repeating unit of the porous resin layer, and as the absorption peak intensity derived from the repeating unit of the porous resin layer to be compared, an absorption peak having the highest absorption peak intensity is selected among the plurality of absorption peaks. For example, when the porous resin layer is formed of the polysulfone-based resin, the intensity of an absorption peak (around 1245 cm$^{-1}$) derived from stretching vibration of O—C—O is adopted as the absorption peak intensity derived from the repeating unit. When the porous resin layer is formed of polyimide, polyetherimide, or polyvinylidene fluoride, the intensities of absorption peaks (around 1720 cm$^{-1}$ and/or 1780 cm$^{-1}$ and 1180 cm$^{-1}$, respectively) derived from an imide group and a C—C bond, respectively, can be adopted.

The total thickness of the porous support including the porous resin layer is, for example, about 50 to 200 μm, and preferably about 80 to 150 μm. The thickness of the porous resin layer is, for example, 10 to 50 μm, and preferably 20 to 40 μm. The porosity of the porous resin layer is, for example, 50 to 80%, and preferably 60 to 70%.

Examples of a preferable method for forming the separation functional layer containing the polyamide-based resin on the surface of the porous support include an interfacial condensation method. Specifically, the interfacial condensation method is a method in which a separation functional layer is formed by bringing an aqueous amine solution containing a polyfunctional amine component into contact with an organic solution containing a polyfunctional acid halide component to perform interfacial polymerization, and the separation functional layer is placed on a porous support, or a method in which a separation functional layer of a polyamide-based resin is directly formed on a porous support by the interfacial polymerization on the porous support. The conditions and the like of the interfacial condensation method are described in detail in JP-A-S58-24303 and JP-A-H01-180208 and the like, and these known techniques can be appropriately adopted.

In particular, in a method for producing a composite semipermeable membrane by forming a polyamide-based skin layer (separation functional layer) by means including a step of coating a porous support with a solution A containing a polyfunctional amine component and a step of bringing a solution B containing a polyfunctional acid halogen component into contact with the solution A phase, it is preferable to add an interface adjusting agent such as an alkanolamine compound, an alkyl ketone compound, or an alkyl ester compound to the solution A.

Examples of the alkanolamine compound include ethanolamine, methanolamine, propanolamine, and butanolamine, and any of monoalkanolamine, dialkanolamine, and trialkanolamine may be used. A hydrogen atom bonded to a nitrogen atom of the alkanolamine compound may be substituted with an alkyl group, an alkenyl group, an alkynyl group, or a phenyl group or the like. Among them, trialkanolamine is preferable, and triethanolamine, tri (t-butanol)amine, and tri (isopropanol)amine are more preferable.

Examples of the alkyl ketone compound include acetone, diisopropyl ketone, and cyclohexanone, and examples of the alkyl ester compound include ethyl acetate, propyl acetate, and butyl acetate.

The concentration of the interface adjusting agent is preferably 0.1 to 10.0% by mass, and more preferably 1.0 to 5.0% by mass in the solution A, from the viewpoint of increasing the amide intensity ratio to improve the water permeability.

The amide intensity ratio can also be adjusted by the difference in solubility parameter between the solution A and the solution B and the solubility parameter of the compound added to the solution A and/or the solution B. When a composite semipermeable membrane having an amide intensity ratio as described above is produced, a compound having a solubility parameter of 8 to 17 $(cal/cm^3)^{1/2}$ is preferably present in at least one selected from the solution A, the solution B, and the microporous support.

Examples of a solubility parameter adjusting agent include alcohols such as ethanol, propanol, butanol, and pentanol, and nitrogen compounds such as ethylamine, triethylamine, and n-butylamine. The solubility parameter can also be adjusted depending on the types and concentrations of the polyfunctional amine component and the polyfunctional acid halogen component to be used.

In order to improve the salt-rejection property, water permeability, and antioxidant resistance and the like of the composite semipermeable membrane, various conventionally known treatments may be applied to the composite semipermeable membrane.

The composite semipermeable membrane of the present invention preferably has a rejection of geosmin of 99.5% or more in the measurement method of Examples described later. In the measurement method of Examples, the water permeability when evaluated using model water that simulates river water is preferably 8.0 LMH/bar or more, and more preferably 9.0 LMH/bar or more.

(Spiral Membrane Element)

The spiral membrane element of the present invention is characterized by having a composite semipermeable membrane as described above, and any configuration of a conventional membrane element can be adopted for portions other than the composite semipermeable membrane.

For example, as shown in FIG. 1, the spiral membrane element of the present invention includes a perforated central pipe 5 and a roll R wound around the central pipe 5 and including a separation membrane 1.

In the example shown in FIG. 1, the membrane element includes a plurality of membrane leaves L in each of which a permeation-side flow-channel member 3 is interposed between separation membranes 1 opposed to each other; a supply-side flow-channel member 2 interposed between any two of the membrane leaves L; a perforated central pipe 5 around which the membrane leaves L and the supply-side flow-channel members 2 are wound; and a sealing part 12 for preventing the mixing of supply-side flow-channels with permeation-side flow-channels. In this case, the permeation-side flow-channel in the membrane leaves L can be formed by the permeation-side flow-channel member 3 (also referred to as a permeation-side spacer).

It is also possible to form the supply-side flow-channel and/or the permeation-side flow-channel in the separation membrane 1 itself by providing irregularities or grooves or the like on the surface of the separation membrane 1. In this case, it is possible to omit the supply-side flow-channel member 2 and/or the permeation-side flow-channel member 3.

FIG. 1 shows an example in which the sealing part includes a both-end sealing part and an outer circumferential-side sealing part 12. In the sealing parts, the both-end sealing part is obtained by using an adhesive to seal ends of two sides of each of the membrane leaves L on both sides of the leaf in an axial direction A1. The outer circumferential-side sealing part 12 is obtained by using an adhesive to seal ends of the outer circumferential-side tip of each of the membrane leaves L. A band surrounded by the separation membranes 1 facing each other, the both-end sealing part, and the outer circumferential-side sealing part 12 serves as the permeation-side flow-channel. This communicates with an opening 5a of the central pipe 5.

It is preferable to have a central side sealing part in which the perforated central pipe 5 and the base end side of the both end sealing parts of the membrane leaf L are sealed with an adhesive. The membrane element includes the roll R in which the membrane leaf L and the supply-side flow-channel member 2 are wound around the central pipe 5 with such a central-side sealing part interposed therebetween. The adhesive is not particularly limited, and any conventionally known adhesive such as a urethane-based adhesive or an epoxy-based adhesive can be used.

A first end member 10 having a function of a seal carrier or the like may be provided on the upstream side of the roll R of the membrane element, and a second end member 20 having a function of an anti-telescoping device or the like may be provided on the downstream side.

In a typical spiral membrane element having a diameter of 8 inches, about 15 to 30 sets of membrane leaves L are wound. When the membrane element is used, the membrane element E is accommodated in a pressure vessel (vessel), and a supply liquid 7 is supplied from one end surface side of the membrane element. The supplied supply liquid 7 flows along the supply-side flow-channel members 2 into a direction parallel with the axial direction A1 of the central pipe 5, and is then discharged as a concentrated liquid 9 from the other end surface side of the membrane element. In the process in which the supply liquid 7 flows along the supply-side flow-channel members 2, a permeation liquid 8 which has permeated through the separation membranes 1 flows along the permeation-side flow-channel members 3, then flows into the central pipe 5 from the opening 5a, and is discharged from the end of the central pipe 5.

The supply-side flow-channel member 2 generally has a function of ensuring spaces, the spaces being for uniformly supplying a fluid onto a membrane plane. The supply-side flow-channel member 2 to be used may be, for example, a net, a knitted fabric, or a sheet worked to have irregularities. Such a member that has a maximum thickness of about 0.1 to 3 mm can be appropriately used if necessary. When the flow-channel member is set on each of both surfaces of the separation membrane 1, two different flow-channel members are generally used: one thereof is used, on the supply liquid side, as the supply-side flow-channel member 2, and the other is used, on the permeation liquid side, as the permeation-side flow-channel member 3. In the supply-side flow-channel member 2, a thick network flow-channel member having large meshes is used, and in the permeation-side flow-channel member 3, a woven fabric or knitted fabric channel member having fine meshes is preferably used.

When an RO membrane or an NF membrane is used for the purpose of, for example, seawater desalination or waste water treatment, each of the permeation-side flow-channel members 3 is located to be interposed between any opposed two of the separation membranes 1 in the membrane leaves L. The permeation-side flow-channel member 3 is required to support the separation membranes from the back sides of the membranes against pressure applied to the membrane, and further to ensure flow-channels for permeation liquid 8.

In order to ensure such a function, the permeation-side flow-channel member 3 is preferably formed of a tricot knitted fabric, and more preferably a tricot knitted fabric subjected to resin impregnation reinforcement or fusion treatment after the formation of the knitted fabric.

As the separation membrane 1, the composite semipermeable membrane of the present invention described above is used. That is, a spiral membrane element of the present invention includes a composite semipermeable membrane including: a porous support including a porous resin layer; and a separation functional layer formed of a polyamide-based resin on the porous resin layer. The polyamide-based resin contains a resin component derived from a divalent polyfunctional amine and a trivalent or higher polyfunctional acid halide, a molar ratio of the trivalent or higher polyfunctional acid halide to the divalent polyfunctional amine is in a range of 0.65 to 1.00, and a terminal carboxyl group concentration is 0.01 or less. The composite semipermeable membrane has an amide intensity ratio of 0.60 or more, the amide intensity ratio being a ratio of an absorption peak intensity derived from $C=O$ stretching vibration of an amide group to an absorption peak intensity derived from a repeating unit of the porous resin layer, when measuring the absorption peaks by an ATR-IR method.

In the case of a typical spiral membrane element, an exterior member 15 is provided on the outer periphery of the roll R. The exterior member 15 is not particularly limited, and examples thereof include various sheets, films, and tapes. If necessary, a fiber reinforced resin (FRP) or the like is used for reinforcement. As a method for forming the fiber reinforced resin, a method for winding a roving in which a fiber is impregnated with a curable resin around the outer periphery of the roll R is preferable.

(Use)

The composite semipermeable membrane of the present invention is used for the production of drinking water, which has been increasingly demanded overseas in recent years, and is particularly effective as a composite semipermeable membrane excellent in rejection performance against organic compounds (for example, molecular weight: 150 to 250) such as herbicides and odor components and water permeability when removing the organic compounds.

The same applies to the use as a spiral separation membrane element. The spiral separation membrane element is used for the production of drinking water, and is particularly effective as a spiral separation membrane element excellent in rejection performance against organic compounds (for example, molecular weight: 150 to 250) such as herbicides and odor components and water permeability when removing the organic compounds.

EXAMPLES

Hereinafter, the present invention will be described with reference to Examples, but the present invention is not limited to these Examples. In Examples and the like, physical properties and the like were measured or evaluated by the following methods. The physical property values and the like in the present invention are specifically values measured by the following methods.

(1) Molar Ratio (TMC/MPD)

A prepared composite semipermeable membrane was immersed in cyclohexanone, and a polyamide-based resin in a skin layer was recovered. The polyamide-based resin was then collected in a stainless steel tube, and methanol and alkali were added into the stainless steel tube, followed by heating the mixture at 240° C. for 1 hour to decompose the polyamide-based resin. Thereafter, the decomposition solution was left to cool to room temperature, and then recovered and subjected to 1H-NMR measurement as follows.

(Measurement Conditions)

Apparatus BRUKER Biospin, AVANCEIII-600,

Measurement solvent: DMSO-d6,

Chemical shift standard: 2.50 ppm (heavy DMSO),

Integration: 64 times,

Chemical shift: meta-phenylenediamine (7.56 ppm), trimesic acid chloride (8.60 ppm).

Data obtained by the measurement was analyzed, and the molar ratio (TMC/MPD) of trimesic acid chloride (TMC) to m-phenylenediamine (MPD) was calculated from the area value of a peak.

(2) Terminal Carboxyl Group Concentration

The composite semipermeable membrane was set in a cell (effective membrane surface area: 44.2 cm$^2$) of a cross flow test system for flat membrane evaluation, and washed under a pressure of 1.5 MPa for 30 minutes with RO (reverse osmosis separation) water. Thereafter, the composite semipermeable membrane was dried at room temperature for 12 hours to prepare a measurement sample.

A sample is subjected to gas phase chemical modification with a labeling reagent (trifluoroethanol), and simultaneously, the reaction rate (r) of the labeling reagent and the residual ratio (m) of a reaction residue are determined from the ESCA spectrum of a polyacrylic acid standard sample subjected to gas phase chemical modification. Next, the area intensity [F1s] of an F1s peak (peak of 1S orbital of fluorine) formed by the reaction between the sample and the labeling reagent is determined. The area intensity [C1s] of a peak (peak of 1S orbital of carbon) defined in the present invention is determined.

The measurement conditions are shown below. QUANTUM 2000 manufactured by ULVAC-PHI, Inc., was used. X-ray output: 15 kV and detector angle: 45° were set and the C1s peak position of neutral carbon (CHx) was adjusted to 285 eV in data processing.

A carboxyl group concentration can be determined by substituting the area intensities [F1s] and [C1s] determined as described above into the following formula:

$$\text{Terminal carboxyl group concentration } [-] =$$

$$\text{number of moles of } COOH/\text{number of moles of } C \; [-] =$$

$$[F1s]/((3k_{F1s}[C1s] - (2 + cm)[F1s])r)$$

in the formula, [F1s]: area intensity of peak of 1S orbital of fluorine, $k_{F1s}$: sensitivity correction value of peak of 1S orbital of fluorine, r: reaction rate of labeling reagent, c: number of carbon atoms of catalyst, [C1s]: area intensity of peak of 1S orbital of carbon, and m: residual ratio of reaction residue.

(3) Amide Intensity Ratio

The composite semipermeable membrane was set in a cell (effective membrane surface area: 44.2 cm$^2$) of a cross flow test system for flat membrane evaluation, and washed under a pressure of 1.5 MPa for 30 minutes with RO (reverse osmosis separation) water. Thereafter, the composite semipermeable membrane was dried at room temperature for 12 hours to prepare a measurement sample. The measurement sample was attached to a Fourier transform infrared spectrophotometer (Spectrum TWO manufactured by PerkinElmer, Inc.), and scanning was performed in the range of 700 to 4000 cm$^{-1}$ by an ATR-IR method under the conditions of an incident angle of 45° and the number of reflections of 25 using an ATR crystal made of germanium as an accessory for total reflection measurement. An absorption peak intensity (around 1620 cm$^{-1}$) derived from C=O stretching vibration of an amide group of a polyamide-based resin as a forming material of a separation functional layer and an absorption peak intensity (around 1245 cm$^{-1}$) derived from stretching vibration of O—C—O of a polysulfone-based resin as a forming material of a porous resin layer were measured (the number of scans: 16). From these results, an amide intensity ratio was calculated according to the following formula:

$$
\begin{aligned}
\text{Amide intensity ratio } (-) = \\
\text{absorption peak intensity}\left(\text{around } 1620 \text{ cm}^{-1}\right)/ \\
\text{absorption peak intensity}\left(\text{around } 1245 \text{ cm}^{-1}\right)
\end{aligned}
$$

(4) Evaluation of Rejection of Geosmin

A flat-shaped composite semipermeable membrane was cut into a predetermined shape and size, and set in a cell (effective membrane surface area: 44.2 cm$^2$) of a cross flow test system for flat membrane evaluation. A geosmin aqueous solution having a concentration of 1 ppm was caused to permeate the composite semipermeable membrane at an operating pressure of 0.5 MPa, a temperature of 25° C., and a pH of 6.5 for 30 minutes, and a rejection of geosmin was then measured. The concentration of each of a supply liquid and a permeation liquid was measured with a GC/MS analyzer (Agilent 5975 MSD manufactured by Agilent Technologies, Inc.), and the rejection of geosmin was calculated from the measurement result according to the following formula:

<Rejection of Geosmin>

$$
\begin{aligned}
\text{Rejection } (\%) = \\
\left(1-\left(\text{concentration of geosmin in membrane permeation liquid}/\right.\right. \\
\left.\left.\text{concentration of geosmin in supply liquid}\right)\right) \times 100
\end{aligned}
$$

(5) Evaluation of Water Permeability Using Model Water

A flat-shaped composite semipermeable membrane was cut into a predetermined shape and size, and set in a cell (effective membrane surface area: 44.2 cm$^2$) of a cross flow test system for flat membrane evaluation. A pressure was adjusted so that a water permeation amount was 25 LMH (Lm$^{-2}$ h$^{-1}$), and model water, that simulates river water, having the following composition at a concentration of 500 ppm was caused to permeate the composite semipermeable membrane at a temperature of 25° C. and a pH of 6.5 for 30 minutes. Using a pressure at a lapse of 30 minutes (pressure after a lapse of 30 minutes) at that time, water permeability was determined according to the following formula:

<Water Permeability>

$$
\text{Water permeability } \left(LMH/\text{bar}\right) = \\
25 \ LMH/(\text{pressure required to produce } 25 \ LMH)
$$

<Composition of Model Water that Simulates River Water>

A composition having a concentration of 500 ppm, containing 2.50 g of sodium chloride (NaCl), 0.27 g of sodium nitrate (NaNO$_3$), 0.73 g of sodium silicate (SiO$_2$Na$_2$O), 9.10 g of sodium sulfate (Na$_2$SO$_4$), 5.33 g of magnesium chloride hexahydrate (MgCl$_2$·6H$_2$O), 5.83 g of magnesium sulfate heptahydrate (MgSO$_4$·7H$_2$O), 7.33 g of calcium chloride (CaCl$_2$)), and 0.33 g of potassium chloride (KCl) in 50 L of pure water.

(6) Evaluation of Alkali Durability

A flat-shaped composite semipermeable membrane was cut into a predetermined shape and size, and set in a cell (effective membrane surface area: 44.2 cm$^2$) of a cross flow test system for flat membrane evaluation. A NaCl solution having a concentration of 500 ppm was caused to permeate the composite semipermeable membrane at a pressure of 4.8 bar, a temperature of 25° C., and a pH of 6.5 for 30 minutes. An amount of water permeation at the time of elapse of 30 minutes was calculated as an initial permeation flux (unit: m$^3$/m$^2$/d). The prepared flat-shaped composite semipermeable membrane was cut into the same shape and size, and then immersed in 500 mL of an aqueous solution of sodium hydroxide (pH 13, 25° C.) for 7 days. The permeation flux (unit: m$^3$/m$^2$/d) of the composite semipermeable membrane after alkali contact was measured in the same manner. A flux change rate was calculated by the following formula:

$$
\text{Flux change rate}(-)=\text{flux after alkali contact/initial flux}
$$

Example 1

An amine aqueous solution containing 2.5% by mass of m-phenylenediamine (MPD), 0.1% by mass of sodium dodecyl sulfate, 2.6% by mass of triethylamine, 1.7% by mass of triethanolamine as an interface adjusting agent, 0.03% by mass of sodium hydroxide, 6% by mass of camphorsulfonic acid, 1.5% by mass of magnesium nitrate, and 4% by mass of isopropyl alcohol was applied to the surface of a polysulfone porous resin layer (thickness: about 130 μm, porosity: about 60%) formed on a polyester nonwoven fabric, and then an excess amine aqueous solution was removed to form an aqueous solution coating layer.

Next, the surface of the aqueous solution coating layer was immersed for 7 seconds in an acid chloride solution in which 0.2% by mass of trimesic acid chloride (TMC) and 0.2% by mass of 2-methyl-2-butanol were dissolved in a naphthenic solvent (Exxsol D40 manufactured by Exxon Mobil Corporation). The excess solution on the surface of the aqueous solution coating layer was then removed. The aqueous solution coating layer was air-dried for 20 seconds, and held in a hot air dryer at 140° C. for 3 minutes to form a separation functional layer containing a polyamide resin on the porous polysulfone support layer, thereby preparing a composite semipermeable membrane in which a nonwoven substrate, a polysulfone porous support, and a polyamide separation functional layer were arranged in this order. The evaluation results are shown in Table 1.

Example 2

A composite semipermeable membrane was prepared under the same conditions as in Example 1 except that triethanolamine as an interface adjusting agent was changed to tri (t-butanol)amine in Example 1. The evaluation results are shown in Table 1.

Example 3

A composite semipermeable membrane was prepared under the same conditions as in Example 1 except that triethanolamine as an interface adjusting agent was changed to tri (isopropanol)amine in Example 1. The evaluation results are shown in Table 1.

Example 4

A composite semipermeable membrane was prepared under the same conditions as in Example 1 except that the content of triethanolamine as an interface adjusting agent in Example 1 was changed to 2.0% by mass. The evaluation results are shown in Table 1.

Comparative Example 1

A composite semipermeable membrane were prepared under the same conditions as in Example 1 except that an amine aqueous solution was prepared so that the concentrations of other components was the same without using triethanolamine as an interface adjusting agent in Example 1. The evaluation results are shown in Table 1.

Comparative Example 2

A composite semipermeable membrane obtained by decomposing and taking out a commercially available NF membrane element (NF90-400 manufactured by Dupont) was used. The evaluation results are shown in Table 1.

Comparative Example 3

A composite semipermeable membrane obtained by decomposing and taking out a commercially available NF membrane element (NF270-400 manufactured by Dupont) was used. The evaluation results are shown in Table 1.

obtain desired rejection performance and is excellent in both alkali durability and water permeability, and a spiral membrane element including the composite semipermeable membrane.

In particular, in recent years, as a composite semipermeable membrane used for the production of drinking water overseas, there is an increasing demand for a composite semipermeable membrane excellent in rejection performance against organic compounds (for example, molecular weight: 150 to 250) such as herbicides and odor components and water permeability when removing the organic compounds, and the composite semipermeable membrane of the present invention is particularly effective as a separation membrane for use in removing such organic compounds.

What is claimed is:

1. A composite semipermeable membrane comprising:
a porous support including a porous resin layer; and
a separation functional layer formed of a polyamide-based resin on the porous resin layer,
wherein
the polyamide-based resin contains a resin component derived from a divalent polyfunctional amine and a trivalent or higher polyfunctional acid halide, a molar ratio of the trivalent or higher polyfunctional acid halide to the divalent polyfunctional amine is in a range of 0.65 to 1.00, and a terminal carboxyl group concentration is 0.01 or less, and
the composite semipermeable membrane has an amide intensity ratio of 0.60 or more, the amide intensity ratio being a ratio of an absorption peak intensity derived from C=O stretching vibration of an amide group to an absorption peak intensity derived from a repeating unit

TABLE 1

| | Interface adjusting agent | Content (% by mass) | Molar ratio TMC/MPD (—) | Terminal carboxylic acid amount (—) | Amide intensity ratio (1620 cm−1/ 1245 cm−1) (—) | Rejection of geosmin (%) | Water permeability (LMH/bar) | Initial flux (m3/m2/d) | Flux after alkali contact (m3/m2/d) | Flux change rate (after contact/ initial) (—) |
|---|---|---|---|---|---|---|---|---|---|---|
| Example 1 | Triethanolamine | 1.7 | 0.82 | 0.007 | 0.65 | 99.61 | 10.7 | 1.5 | 1.54 | 1.02 |
| Example 2 | Tri(t-butanol) amine | 1.7 | 0.71 | 0.008 | 0.64 | 99.59 | 9.3 | 1.5 | 1.51 | 1.02 |
| Example 3 | Tri(isopropanol) amine | 1.7 | 0.89 | 0.007 | 0.62 | 99.56 | 9.6 | 1.5 | 1.52 | 1.01 |
| Example 4 | Triethanolamine | 2.0 | 0.90 | 0.009 | 0.66 | 99.53 | 10.9 | 1.6 | 1.6 | 1.01 |
| Comparative Example 1 | Absence | 0 | 0.82 | 0.014 | 0.56 | 99.73 | 7.7 | 1.1 | 1.33 | 1.26 |
| Comparative Example 2 | (NF90-400) | | 0.61 | 0.006 | 0.55 | 99.34 | 7.9 | 1.3 | 1.26 | 1.01 |
| Comparative Example 3 | (NF270-400) | | — | 0.007 | — | 89.3 | 11.7 | 1.9 | 47.86 | 25.11 |

As shown in the results of Table 1, Examples 1 to 4 were excellent in both alkali durability and water permeability while having a rejection of geosmin of 99.5% or more.

Meanwhile, in Comparative Example 1 having a high terminal carboxyl group concentration and a low amide intensity ratio, both alkali durability and water permeability were reduced. In Comparative Example 2 using a commercially available product, ab amide intensity ratio was low, and a rejection of geosmin and water permeability were insufficient, and in Comparative Example 3, a rejection of geosmin was significantly reduced.

According to the present invention, it is possible to provide a composite semipermeable membrane which can of the porous resin layer, when measuring the absorption peaks by an ATR-IR method.

2. The composite semipermeable membrane according to claim 1, wherein
the polyamide-based resin contains a resin component derived from m-phenylenediamine (MPD) and trimesic acid chloride (TMC), and
a molar ratio of TMC to MPD (TMC/MPD) is in a range of 0.65 to 1.00.

3. The composite semipermeable membrane according to claim 1, wherein
the porous resin layer is formed of a polysulfone-based resin, and the absorption peak intensity derived from the repeating unit is an absorption peak intensity derived from stretching vibration of O—C—O.

4. The composite semipermeable membrane according to claim 1, wherein a rejection of geosmin is 99.5% or more.

5. The composite semipermeable membrane according to claim 4, having a water permeability of 9.0 LMH/bar or more when evaluated using model water that simulates river water.

6. A spiral membrane element comprising the composite semipermeable membrane according to claim 1.

7. A spiral membrane element comprising the composite semipermeable membrane according to claim 2.

8. A spiral membrane element comprising the composite semipermeable membrane according to claim 3.

9. A spiral membrane element comprising the composite semipermeable membrane according to claim 4.

10. A spiral membrane element comprising the composite semipermeable membrane according to claim 5.

* * * * *